April 30, 1968  M. E. TAYLOR  3,381,218
SIGNAL CHANNEL TESTING METHOD AND APPARATUS
UTILIZING AN INVERSE FILTER
Filed Feb. 17, 1964  2 Sheets-Sheet 1
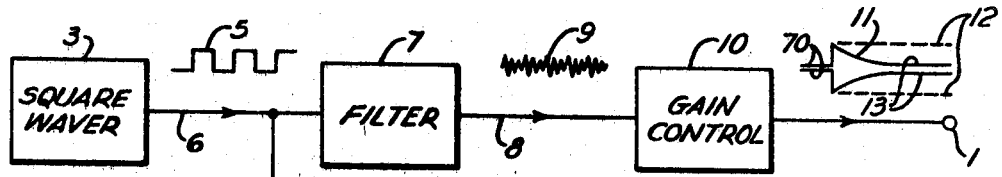
Fig.1
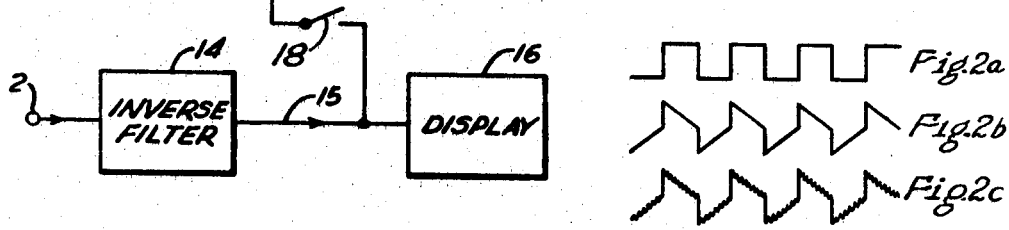
Fig.2a
Fig.2b
Fig.2c
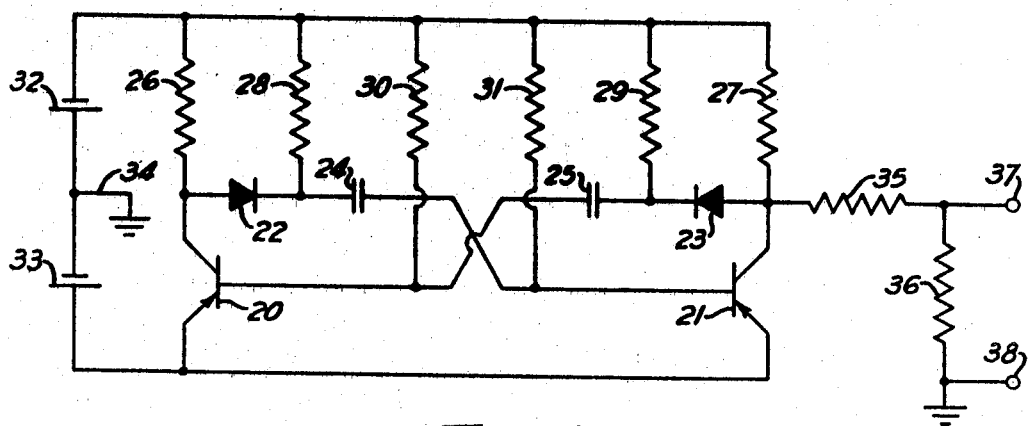
Fig.3
INVENTOR.
MAURICE E. TAYLOR
BY
ATTORNEY.

INVENTOR.
MAURICE E. TAYLOR

3,381,218
SIGNAL CHANNEL TESTING METHOD AND APPARATUS UTILIZING AN INVERSE FILTER

Maurice E. Taylor, Borough of Monroeville, Pa., assignor to Gulf Research & Development Company, Pittsburgh, Pa., a corporation of Delaware
Filed Feb. 17, 1964, Ser. No. 345,254
8 Claims. (Cl. 324—57)

This invention relates to a method and apparatus for testing a signal transmission channel and in particular concerns a simple testing system for an electrical communication channel which system is simple to operate and which has a high degree of sensitivity for detecting distortion and other subtle faults in the channel.

Many electrical signal channels are required to maintain their operating characteristics over a considerable time and in spite of rough handling. Such devices as telemetering channels, long-range signalling devices, as for example to unmanned satellites, as well as a variety of measuring devices, have inaccessible components subject to severe conditions and it is highly desirable for the operator to be able quickly to determine whether or not the channel is operating properly. Various types of malfunction can occur which if permitted to continue will result in erroneous interpretation of the transmitted signal, so that appropriate steps must promptly be taken to correct or neutralize the malfunction. This invention provides a method and apparatus for testing the channel and which is especially sensitive to signal distortion types of malfunction.

While the invention is applicable to a large variety of signal transmission systems, such as pneumatic, electric, etc. it will be described by way of example as applied to an electrical system and in particular to an electrical seismograph channel such as is employed in seismic prospecting. It is well known in the seismic prospecting art to employ amplifiers including filters having special characteristics in order to improve the signal-to-noise ratio of the recorded seismogram. The equipment is portable and must withstand extremes of temperature, moisture, and vibration in field operation. Inasmuch as interpretation of the seismic survey is made by comparing seismograms taken at adjacent locations it is important that the apparatus maintain its characteristics in order that spurious effects not be introduced by instrumental malfunction. Inasmuch as a change in the arrival time of a seismic event of but a few milliseconds in several seconds may have significance in the interpretation it is important for the seismogram interpreter to be sure that the apparatus is in proper working order. It is known that certain types of signal distortion are particularly objectionable in such a seismograph channel. Similar considerations apply to many other types of signalling and communication channels. This invention provides a simple testing system for such a channel.

The invention makes use of the fact that many such channels transmit a signal that has already undergone filtering elsewhere than in the apparatus under test. For example, in a satellite communication system the signal must traverse the earth's atmosphere which materially affects the nature of the signal. In the seismic system for which the invention will be described by way of example, the seismic signal undergoes substantial filtering during its transit through the earth. Any effect that results from extra-instrumental filtering is of course independent of the signal transmission apparatus employed. In the testing system of this invention the extra-instrumental filtering is artificially introduced into the signal prior to the testing operation and subsequently neutralized after the testing operation so that the test results are not masked by the extra-instrumental effects but show clearly an effect due to instrumental malfunction.

Accordingly, it is an object of this invention to provide a testing system for a signal channel that has improved sensitivity to instrumental malfunction in the signal channel.

It is a further object of this invention to provide a method and apparatus for testing an electrical signal transmission channel that substantially eliminates extra-instrumental effects.

It is another object of this invention to provide a communication signal channel testing method and apparatus in which the channel is tested with a signal that closely approximates a normal signal for the channel.

It is another object of this invention to provide a communication signal channel testing method and apparatus in which the test results amplify instrumental distortion effects.

In particular it is an object of this invention to provide a method and apparatus for testing an electrical seismograph channel that quickly shows the operator the presence of instrumental malfunction and that is substantially independent of extra-instrumental effects.

These and other useful objects are attained by this invention as described in this specification with reference to the accompanying drawings forming a part thereof, and in which FIGURE 1 is a block diagram of the apparatus employed in this invention;

FIGURES 2(a), 2(b), and 2(c) illustrate examples of signals displayed with the apparatus of this invention;

FIGURE 3 is a circuit diagram of a signal-generating source employed in this invention;

Figure 4:
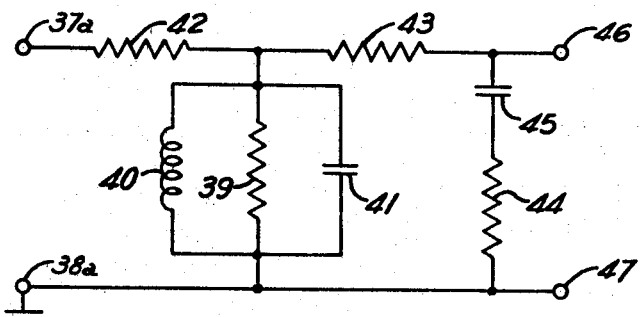
FIGURE 4 is a circuit diagram of one type of filter that may be employed in this invention.

In this invention a signal having a known wave form is generated, preferably but not necessarily a repetitive signal of easily recognizable wave form, which may conveniently be a square wave of relatively low repetition frequency. This signal is filtered through a first filter whose characteristic is such as will convert this signal into a signal that approximates a signal such as would normally be transmitted by the channel being tested. The thus-modified signal is then impressed on the channel being tested. The channel output signal is filtered through a second filter whose characteristic is the inverse of the first filter. By this expedient the effect of the first filter is neutralized or compensated and only the effect of transmission through the channel remains. The wave form of the final test signal is then compared with that of the original test signal. Since the original test signal has an easily recognizable characteristic wave form the comparison is readily made by visual inspection, and any instrumental distortion or other instrumental malfunction becomes immediately apparent. On the other hand such distortion as normally arises from extra-instrumental causes, while present in the test signal as transmitted through the channel, is removed from the test result thereby to make the instrumental effects stand out clearly wtihout dilution. In the example to be described, a normally recorded seismic signal may contain substantial distortion due to earth filtering, and any additional instrumental distortion is not easily detected in normal operation. However, in testing a seismograph channel according to this invention the extra-instrumental distortion is substantially eliminated and any instrumental distortion is amplified and becomes clearly observable.

Reference is first made to FIGURE 1 which shows a block diagram of the apparatus of this invention as applied to a seismic system tester. FIGURE 1 shows in its upper portion that part of the apparatus of this invention that is connected to the input of the instrument being tested which in the example to be described may be a seismograph amplifier-recorder channel. The lower portion of FIGURE 1 shows that part of the apparatus of this invention that is connected to the output of the channel being tested. The channel being tested is connected between terminals 1 and 2. In FIGURE 1, the source signal is generated by a signal generator 3. Signal generator 3 generates a signal of known wave form, having preferably an easily recognizable wave form, as for example a square wave having a relatively low repetition rate, a rate of between two and ten per second being convenient for most test purposes although a higher rate may be more advantageous for some applications. The form of the wave output from generator 3 is illustrated at 5 and is delivered over connection 6 to a first filter 7. Filter 7 is such as to convert the square wave 5 into a repetitive series of signals that are of substantially the same wave form as the signals usually handled by the channel being tested when the channel is operating in normal service. Thus for example, each step function of the square wave 5 contains a large number of frequencies and in testing a seismograph channel the filter 7 is designed in well-known manner to attenuate those frequencies, both high and low, that would normally be attenuated in transmission of a seismic impulse through the earth. The signal in the output connection 8 of the filter will then have the general form pictured at 9, being a repetitive series of pulses each of which resembles a seismic impulse such as would be received by the seismic amplifier being tested when operating in seismic field service. Ordinarily the signal in connection 8 may be employed as the input to the signal channel being tested. However, in the case of a seismograph amplifier-recorder channel the usual succession of seismic signals varies over a wide dynamic range, e.g., in reflection shooting the signal starts at a high amplitude and falls off to lower amplitudes for weaker and weaker reflections, so that for testing a seismic channel it is convenient to employ a signal amplitude control unit 10 that simulates this variation in amplitude of successive impulses that make up the test signal. Accordingly, the apparatus of FIGURE 1 delivers at terminal 1 a signal that was originally a square wave 5 but which was converted by a known filter 7 into a series of signals substantially the same as a series of earth-borne seismic impulses normally received by the seismograph channel being tested, and with the successive signals in the series decreasing in amplitude as shown by the envelope curve 11. The initial high amplitude of the signals is indicated by the dotted lines 12 and the final low amplitude is indicated by the tail end 13 of the envelope 11. This signal from the amplitude-control unit 10 delivered at terminal 1 is applied to the input terminal of the channel being tested. It is apparent that the channel being tested is thus tested with a signal that is substantially the same as that handled by the channel in normal service operation. Examples of elements 3, 7, and 10 will be described later.

The output test signal from the channel being tested is applied to terminal 2 connecting to a second filter 14. The second filter 14 is designed to be the inverse of first filter 7. The inverse filter 14 thus restores to the signal any components previously attenuated by filter 7. An example of element 14 will be described later. Output from the inverse filter 14 is delivered via connection 15 to a display device 16 which may be of any desired appropriate type, such as a graphic recorder, oscillograph recorder, seismograph recorder, cathode-ray oscilloscope, or the like.

The wave form of the final test signal in connection 15 as viewed on the display device 16 is compared with the original signal 5 (obtained from connection 6). The original signal 5 may be shown on the display device 16 by connecting the latter via connection 4 and switch 18 to the connection 6 resulting in a display as shown in FIGURE 2(a). In the example of testing a seismograph amplifier the final signal (from connection 15) as shown by the display device 16 should appear as pictured at FIGURE 2(b). The square wave 5 is reproduced substantially faithfully, except for the fact that a seismograph amplifier does not pass the D-C component. By way of on example, the signal from a malfunctioning amplifier is illustrated at (FIGURE 2(c). The distortion is evident and can cause serious misinterpretation of a seismogram. If such instrumental distortion is known from the test to be present, the seismogram can be discarded and the faulty channel corrected. A primary advantage of the invention lies in the fact that the displayed test result (FIGURE 2(b) or FIGURE 2(c)) is free of the earth-borne distortion, an indication of which is illustrated at 9 but which is compensated by the inverse filter 14. Attention is further called to the fact that the testing system of this invention is not equivalent to simply passing a square wave through the channel, because in the latter case the channel is not subjected to the same signal as it would be in normal operation. Moreover, even a properly operating amplifier would distort a square wave very materially, and a small degree of malfunction would be so diluted that the malfunction could not be discerned. On the other hand by using this invention the amplifier operates on a normal signal just as it would in service, and the final test result shows instrumental distortion in amplified manner. The test signal amplitude control unit 10 employed in testing a seismograph channel and its mode of operation in the test procedure will be described in detail later.

FIGURE 3 shows a circuit diagram of one type of signal generator 3 that may be employed. While a signal generator 3 that generates any type of signal may be used, it is convenient to employ a signal having a repetitive, known, easily recognizable, characteristic wave form, as for example a square wave, saw-tooth wave, ramp wave, or the like. A square wave is easily recognized visually and is easily generated by means of a known type of free-running multivibrator such as illustrated in FIGURE 3. This device known as a square-waver, comprises two transistors 20 and 21 connected to a resistor and condenser network as shown, including diode rectifiers 22 and 23. The condensers 24 and 25 have equal values, and resistors 26, 28, and 30 respectively, have the same values as resistors 27, 29, and 31. The circuit is energized by batteries 32 and 33 whose junction is grounded at 34. Output signal is obtained at terminals 37 and 38 from a voltage divider comprising resistors 35 and 36, terminal 38 being grounded as shown. The output signal is obtained from a voltage divider because a low-level signal is desired to avoid excessive signal on the inductor of the succeeding filter element to be described. The "frequency" or repetition rate of the square wave generated by the circuit of FIGURE 3 is determined by the values of the resistors and condensers employed and may be any convenient rate. By way of example, for testing a seismograph channel a rate of five cycles per second has been found satisfactory. It is apparent that for testing channels that normally operate at high frequency it may be desirable to employ a higher repetition rate for the square wave. For other test purposes it may be desirable to use a non-repetitive signal. Typical component values for the elements of a square waver for use in testing a seismograph channel will be tabulated later.

FIGURE 4 shows a circuit diagram of one form of filter 7 that may be employed. The purpose of filter 7 is to convert the signal of generator 3 into a signal that approximates a signal such as would normally be transmitted by the channel to be tested. The wave form of a normal input signal for the channel is always known at least approximately. It is also well known how to design a filter that will convert a square wave (which is essentially a series of alternating step functions) into the normal wave form, and in any case such a filter can be empirically assembled by trial. In the case of testing a seismograph amplifier it is known that the seismic source (usually an explosion) is closely simulated by an impulse, and that the earth attenuates both the high and low frequencies. It has been found that in this example, a two-section filter such as that shown in FIGURE 4 will convert the square wave into a signal that approximates that which would normally be picked up in field operation. The input terminal 37(a) of the filter is connected to terminal 37 of the square-waver and terminal 38(a) is connected to 38. The first section of the filter is a band-pass filter comprising parallel resonant circuit including inductor 40 and condenser 41, together with series resistor 42 and shunt resistor 39 for the purpose of controlling the band width of the parallel resonant circuit. The band-pass section is followed by an R–C section of limited high-frequency cutoff comprising resistors 43 and 44 and condenser 45. The square wave filtered by the two-section filter of FIGURE 4 is delivered at terminal 46, the low side of the filter being ground terminal 47. The filtered output obtained at terminals 46 and 47 is a succession of oscillating impulses of alternating direction of onset as generally pictured at 9 in FIGURE 1.

Care must be taken in the design and operation of the filter of FIGURE 4. If a high-Q inductor 40 is employed, its signal must be kept at a sufficiently low level so that the required Q value is not lost, this being the purpose of the previously mentioned voltage divider at the output of FIGURE 3. The filter of FIGURE 4 must also be designed in such manner that a practically attainable inverse filter can be built for use as element 14 previously mentioned and to be described in more detail in connection with FIGURE 6. Thus the filters 7 and 14 are preferably designed together, one being the inverse of the other. It is not absolutely essential that the signal output from filter 7 (i.e. the signal at terminal 46) be exactly like a normal operating signal for the equipment to be tested and a reasonable approximation is usually sufficient. It is however essential that the filters 7 (an example of which has been described with reference to FIGURE 4) and 14 (to be described later with reference to FIGURE 6) be quite accurately the inverse of each other. In the art, two filters are said to be the inverse of each other if the Laplace transform of one is the reciprocal of the Laplace transform of the other (c.f. publication by M. M. Backus, Water Reverberations, Their Nature and Elimination: Geophysics, vol. 24, No. 2, pp. 233–261, April 1959, particularly the equation at bottom of page 252), and from this it follows that the product of their frequency response functions is a finite constant, i.e. not zero or infinite.

In many systems the signal from terminal 46 may be applied directly to the signal channel to be tested and terminal 46 becomes terminal 1 of FIGURE 1. However, for testing a seismograph channel it is desirable to also be able to test the AVC system commonly included in a seismograph channel. Accordingly, in the example here described a signal amplitude control element 10 is connected to the output terminals 46 and 47 of the filter.

Figure 5:
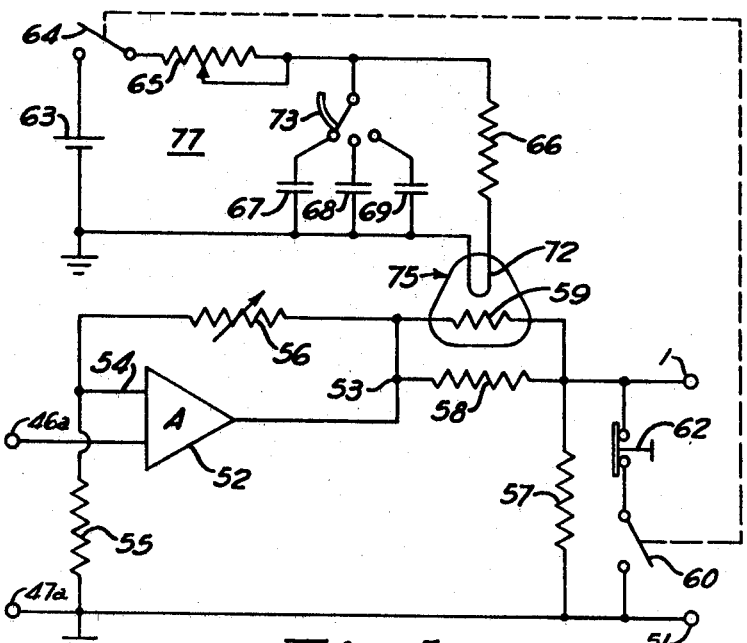
FIGURE 5 is a circuit diagram of one type of signal amplitude control that may be employed in this invention.

An example of a signal-amplitude or gain-control circuit is shown in FIGURE 5.

Referring now to FIGURE 5 which shows in detail the circuit of element 10 of FIGURE 1, the signal from terminal 46 of FIGURE 4 is applied at terminal 46(a) of FIGURE 5, return terminal 47(a) being grounded as indicated. The circuit of FIGURE 5 is primarily a drive circuit having a low output impedance and including a gain-control feature. Such a low impedance drive circuit is convenient for testing seismograph channels because of the large number (usually about twenty-four) of channels which it is usually desired to simultaneously test with a common test signal obtained from the terminal 1 of FIGURE 1. Accordingly, in the present example the circuit of FIGURE 5 is provided with a low impedance output, but this is merely by way of example and may not be required for many test purposes. The filtered signal from terminal 46 is applied to the positive input terminal 46(a) of a conventional operational amplifier 52 having a feedback connection from its output terminal 53 to a negative input terminal 54. The amount of feedback is determined by the ratio of resistors 55 and 56, the latter being variable to provide adjustment of the amplification to a desired value. The amplified output at 53 is attenuated by a voltage-divider network comprising fixed resistor 57 and resistor 58, the latter being shunted by a special type of variable resistance schematically indicated by 59 in FIGURE 5 and which will be described in more detail later. It is apparent that the signal amplitude at output terminal 1 is determined by the ratio of resistance of resistor 57 to the equivalent resistance of parallel resistances 58 and 59, and this ratio can be varied by varying the resistance of resistor 59. The output signal at the terminal 1 can also be short circuited by closing switch 60 which is in series with a normally-closed pushbutton 62. Thus with switch 60 closed, the signal output at terminal 1 is very nearly zero until the pushbutton 62 is pressed whereupon the signal is determined by the voltage divider comprising elements 57, 58, and 59. The input terminal of the seismograph channel or channels under test are connected to terminal 1 with return to ground at terminal 51.

In order to test the seismograph channel at various signal level as well as its AVC action, an automatic signal-varying circuit 77 is included in the circuit of FIGURE 5. The circuit 77 comprises a battery 63 and switch 64, the latter being mechanically connected to switch 60. Switches 60 and 64 may be combined as the two parts of a double-pole single-throw snap switch. Adjustable resistor 65, fixed resistor 66, and a plurality of condensers such as 67, 68, and 69 are connected in the circuit as shown, including also a lamp filament 72 located so as to illuminate previously mentioned resistor 59. A fan switch 73 serves to connect in parallel one or more of the condensers 67, 68, and 69 to adjust the total capacitance in circuit to a desired value.

The elements 59 and 72 are actually located inside a common envelope 75 and are arranged so that light from the lamp filament 72 falls on resistor 59 which is of photoresistive material such that its resistance is greater in darkness than under illumination. Such devices 75 are commercially available, an example being sold under the trade name Raysistor made by Raytheon Company of Lexington, Mass., U.S.A. Accordingly, when the lamp 72 is energized, the resistance of 59 is low and this results in a high signal at terminal 1, whereas when the lamp 72 is not energized, the resistance of 59 increases and the signal at 1 is reduced to a minimum value dependent on the value of resistor 58 as compared to that of resistor 57. It is apparent that when switch 64 is closed the lamp 72 is energized to effect a high signal at 1, but when switch 64 is opened, the lamp 72 gradually goes out as the condensers 67, 68, and/or 69 discharge so that the output signal at terminal 1 gradually decreases to a minimum value. The time constant of the gradual decrease is dependent on the amount of capacitance connected in circuit by switch 73 and the series resistance of resistor 66 and lamp filament 72. When testing a seismograph channel, this time constant is adjusted so that the decrease of output signal at terminal 1 simulates the normal decrease of amplitude of seismic energy with time and may be in the order of one or two seconds. Other time constants, or no time variation at all, may be employed as desired when testing other types of signal channels.

Operation of the circuit of FIGURE 5 will now be apparent. With switches 60 and 64 closed the terminal 1 will be short-circuited to ground through pushbutton 62. Actually due to slight residual resistance in the contacts of 60 and 62 some small signal will still remain on terminal 1 as indicated in FIGURE 1 by the portion 70 of envelope curve 11. When pushbutton 62 is held depressed, the signal at terminal 1 will rise to a high value 12 of FIGURE 1. The magnitude of the high signal 12 may be adjusted by means of variable resistor 65. Instead of pressing pushbutton 62 the operator may simultaneously open switches 60 and 64. Immediately upon opening of switch 64, the signal at terminal 1 will rise to the high value 12 and then decay as the condensers 67–69 discharge through the lamp filament 72. The signal at 1 will eventually reach a minimum value 13 of FIGURE 1. The device being tested (in the present example a seismograph channel) connected to terminal 1 will thus be tested over a range of signal levels between that represented by 12 and that represented by 13.

Output from the device being tested is connected to the apparatus shown in the lower portion of FIGURE 1 for immediate processing or under some circumstances may be reproducibly recorded and processed by the apparatus shown in the lower portion of FIGURE 1 at a subsequent more convenient time and place. Thus for example, the test signal from terminal 1 may be simultaneously applied to all twenty-four channels of a field seismograph system and the channels' outputs recorded on magnetic tape that is subsequently played back into the apparatus shown in the lower portion of FIGURE 1 one trace at a time to complete the tests, the latter being done at a central processing facility. In any case the output signal from the device under test, or an equivalent reproduction of the signal, is applied to terminal 2 of the inverse filter circuit shown in FIGURE 6, return being to grounded terminal 51(a). The characteristic of filter circuit of FIGURE 6 is the inverse of that of the filter circuit of FIGURE 4.

Figure 6:
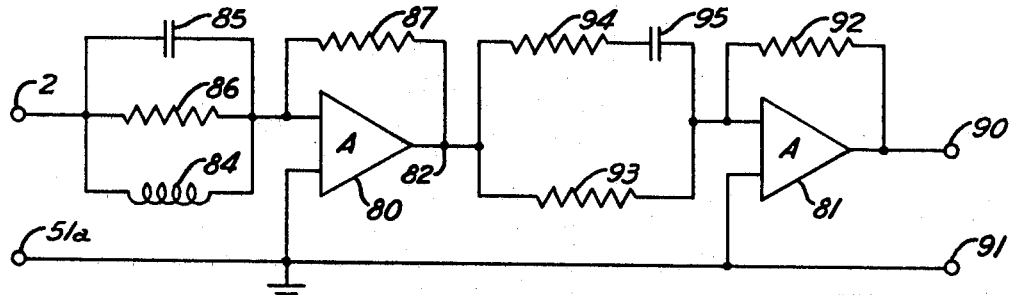
FIGURE 6 is a circuit diagram of one type of inverse filter that may be employed in this invention.

Referring to FIGURE 6, the inverse filter comprises two amplifiers 80 and 81 which may be conventional operational amplifiers. The test signal from the device being tested is applied at terminal 2 with ground return at terminal 51(a). Amplifier 80 has in series with its input a parallel network comprising inductance 84, condenser 85, and resistor 86. The inductance 84 and condenser 85 have substantially the same values as the corresponding elements 40 and 41 of the filter of FIGURE 4. The resistor 86 has a value that is equivalent to the parallel combination of resistors 39 and 42 of FIGURE 4. Some slight adjustment of resistor 86 may be required to compensate for slight tolerance differences in components. A feedback resistor 87 is connected from the output of amplifier 80 to its input. Inasmuch as the circuit of operational amplifier 80 has in its input circuit an impedance whose frequency characteristic is the same as that of the first filter section of FIGURE 4, the circuit of amplifier 80 will produce at terminal 82 a filtering effect that is substantially the inverse of the filtering effect of the first filter section of FIGURE 4.

In FIGURE 6 the circuit of operational amplifier 81 will result in the inverse of the second filter section of FIGURE 4. Amplifier 81 has in series with its input a resistor 94 and condenser 95 together in parallel with resistor 93, these elements being equivalent to elements 44, 45, and 43 of FIGURE 4 respectively. A feedback resistor 92 is connected from the output of amplifier 81 to its input. Since the circuit of operational amplifier 81 has in its input circuit an impedance whose frequency characteristic is the same as that of the second filter section of FIGURE 4, the circuit of amplifier 81 will produce a filtering effect that is substantially the inverse of the filtering effect of the second filter section of FIGURE 4. Accordingly, the circuit of FIGURE 6 has a frequency characteristic that is the inverse of that of the circuit of FIGURE 4. Signal output from the inverse filter is obtained at terminal 90, with ground return at terminal 91.

The final test signal delivered at terminal 90 is fed to a display device 16 which displays the signal wave form. Alternatively the final test signal may be reproducibly recorded and subsequently reproduced and displayed, but this is contemplated as being equivalent to immediate display for purposes of this invention. The display device 16 is conveniently a cathode-ray oscilloscope or an oscillograph recorder. The latter is preferred for seismograph channel testing because it gives a permanent record for future reference. It is also convenient to display (or record) the original test signal, i.e. the signal 5 from connection 6 of FIGURE 1 via connection 4 and switch 18, on the display device or recorder for convenient comparison and future reference.

In FIGURE 2(a) there is pictured the original signal 5 of easily recognizable characteristic wave form, and at FIGURE 2(b) the final test signal after filtering, traversing the channel being tested, and inverse filtering. These signals are compared, conveniently by simple visual comparison. The behavior of a properly functioning channel will be known and is easily recognized. Because of the simplicity of the test signal any distortion due to malfunctioning of the channel is immediately recognized. Thus for example, in the signal pictured at FIGURE 2(c), the high-frequency ripple shown is an indication of malfunction of the channel being tested. The malfunction may be due to any of a number of causes and must be corrected by the operator.

It is seen that in this invention the channel under test is tested with a signal that is substantially the same as the normal signal carried by the channel in normal service, and the final test signal shows only that distortion caused by malfunction of the channel. Therefore, any distortion is clearly apparent on the test signal of easily recognizable characteristic wave form. Furthermore, the test signal is not obliterated by the testing process. The observed final test results are thus undiluted by extra-instrumental effects that are not diagnostic of the condition of the channel being tested, and the instrumental distortion is not masked by a major transformation in the wave form of the test signal during transmission. By compensating the extra-instrumental distortion any remaining detrimental instrumental distortion is enhanced and such instrumental distortion becomes clearly discernible.

It is apparent that when a simple known repetitive wave form is employed, as for example the square wave shown for testing a seismograph channel, comparison of the original signal and the final output signal can be made visually. However, for certain test purposes it may be desirable to employ a more complex wave form in which event the comparison can best be made graphically or by well-known digital computer techniques. While the invention has been described in an example using an electrical test signal of repetitive wave form, it will be apparent to those skilled in the art that the signal may be of acoustic or other appropriate nature when testing devices of such nature, and the signal may be non-repetitive if desired for certain types of testing.

By way of example, and not by way of limitation, the following values have been found satisfactory for components making up the respective elements of this invention.

| Element | Component | Specification |
|---|---|---|
| 20 and 21 | Transistors | Type 2N43A. |
| 22 and 23 | Rectifiers | Type 1N100. |
| 24 and 25 | Condensers | 2 mfd. |
| 26 and 27 | Resistors | 5.1 K ohms. |
| 28 and 29 | do | 5.1 K ohms. |
| 30 and 31 | do | 68 K ohms. |
| 32 and 33 | Batteries | Each 15 v. |
| 35 | Resistor | 510 K ohms. |
| 36 | do | 10 K ohms. |
| 39 | do | Selected for desired filter band width. |
| 40 | Inductance | Selected to resonate at the desired frequency, e.g. about 20 c.p.s. for seismograph testing. |
| 41 | Condenser | |
| 42 | Resistor | Selected for desired filter band width. |
| 43 | do | 1 M. — Typical values that may be used for seismograph testing. |
| 44 | do | 51 K. |
| 45 | Condenser | .01 mfd. |
| 52 | Operational amplifier. | High gain, high output current rating, e.g. Philbrick PP65 and PP66. |
| 55 | Resistor | 10 K ohms. |
| 56 | do | 500 K variable. |
| 57 | do | 2.2 ohms. |
| 58 | do | 150 K ohms. |
| 59 | Raysistor | Raytheon CK1114. |
| 60 and 64 | Switch | DPDT snap action. |
| 62 | Pushbutton | Normally closed. |
| 63 | Battery | 15 v. |
| 65 | Resistor | 1,300 ohms variable. |
| 66 | do | 510 K ohms. |
| 67, 68 and 69 | Condensers | 2,000 mfd., 6 V. |
| 80 and 81 | Operational amplifiers. | Philbrick PP65. |
| 84 | Inductance | Impedance to have same frequency characteristic as that of filter comprising elements 39 to 42. |
| 85 | Condenser | |
| 86 | Resistor | |
| 87 | do | Selected to obtain desired gain level. |
| 92 | do | |
| 93 | do | 1 M. — Values correspond to elements 43 to 45. |
| 94 | do | 51 K. |
| 95 | Condenser | .01 mfd. |

What I claim as my invention is:

1. A method of testing a communication channel which comprises generating a first signal having a known wave form, filtering said first signal through a first filter whose impulse response has a Laplace transform $[F(s)]$ such as to convert said first signal into a second signal whose wave form approximates that of a signal normally transmitted by the channel to be tested when in normal service, impressing said second signal on the channel to be tested to obtain a third signal, filtering said third signal through a second filter whose impulse response has a Laplace transform that is substantially the reciprocal of the Laplace transform $[1/F(s)]$ of the impulse response of said first filter to obtain a fourth signal, and displaying the wave form of said first and said fourth signals, whereby the wave form of said fourth signal may be compared with that of said first signal.

2. A method of testing an electrical seismograph channel which comprises generating a first electrical signal of known wave form, filtering said first signal through an electrical filter whose impulse response has a Laplace transform $[F(s)]$ and whose characteristic approximates normal earth filtering of a signal impulse to convert said first signal into a second signal, adjusting the amplitude of said second signal to approximate that of a signal normally transmitted by the seismograph channel in normal service, transmitting said adjusted second signal through the seismograph channel to be tested to produce a third signal, filtering said third signal through a second electrical filter whose impulse response has a Laplace transform that is substantially the reciprocal of the Laplace transform $[1/F(s)]$ of the impulse response of said first filter to obtain a fourth signal, and displaying the wave form of said first and said fourth signals, whereby the wave form of said fourth signal may be compared with that of said first signal.

3. A method of testing an electrical seismograph channel which comprises generating a first electrical signal of square wave form, filtering said first signal through an electrical filter whose impulse response has a Laplace transform $[F(s)]$ and whose characteristic approximates normal earth filtering of a seismic impulse to convert said first signal into a second signal, varying the amplitude of said second signal with time to approximate the amplitude and time variation of seismic energy normally received by the seismograph channel in normal service, transmitting said adjusted second signal through the seismograph channel to be tested to produce a third signal, filtering said third signal through a second electrical filter whose impulse response has a Laplace transform that is substantially the reciprocal of the Laplace transform $[1/F(s)]$ of the impulse response of said first filter to obtain a fourth signal, and displaying the wave form of said first and said fourth signals, whereby the wave form of said fourth signal may be compared with that of said first signal.

4. Apparatus for testing a communication channel which comprises means generating a first signal having a known wave form, a first filter connected to said generating means, said first filter having a characteristic impulse response such as will convert said first signal into a second signal whose wave form approximates that of a signal normally transmitted by the channel to be tested when in normal service and the impulse response of said first filter having a Laplace transform $[F(s)]$, means for impressing said second signal on the channel to be tested, a second filter, means for impressing the output of the channel to be tested on said second filter, said second filter having a characteristic impulse response whose Laplace transform is substantially the reciprocal of the Laplace transform $[1/F(s)]$ of the impulse response of said first filter, signal wave-form display means connected to the output of said second filter, and means adapted to connect said wave-form display means to said first signal generating means, whereby the wave form of the output signal of said second filter may be compared with that of said first signal.

5. Apparatus for testing a communication channel which comprises means generating a first repetitive signal of known wave form, a first filter connected to said generating means, said first filter having a characteristic impulse response such as will convert said first signal into a second signal whose wave form approximates that of a signal normally transmitted by the channel to be tested when in normal service and the impulse response of said first filter having a Laplace transform $[F(s)]$, means connected to said first filter and adapted to adjust the amplitude of said second signal to approximate that of a signal normally transmitted by the channel to be tested when in normal service, means for impressing said adjusted second signal on the channel to be tested, a second filter, means for impressing the output of the channel to be tested on said second filter, said second filter having a characteristic impulse response whose Laplace transform is substantially the reciprocal of the Laplace transform $[1/F(s)]$ of the impulse response of said first filter, signal wave-form display means connected to the output of said second filter, and means adapted to connect said wave-form display means to said first signal generating means, whereby the wave form of the output signal of said second filter may be compared with that of said first signal.

6. Apparatus for testing an electrical seismograph channel which comprises means generating a first electrical signal having a square wave form, a first filter connected to said square-wave generator, said first filter having a characteristic impulse response that approximates the impulse response of normal earth filtering of a seismic impulse and the impulse response of said first filter having a Laplace transform $[F(s)]$, means connected to the output of said first filter controlling the signal level thereof with time in a manner that approximates normal decay of a seismic signal with time, means connecting the output of said signal-level-control means to the input of the seismograph channel to be tested, a second filter, means for impressing the output of the seismograph channel to be tested on said second filter, said second filter having a characteristic impulse response whose Laplace transform is substantially the reciprocal of the Laplace transform $[1/F(s)]$ of the impulse response of said first filter, signal wave-form display means connected to the output of said second filter, and means adapted to connect said wave-form display means to said first signal generating means, whereby the wave form of the output signal of said second filter may be compared with that of said first signal.

7. Apparatus for testing an electrical seismograph channel having input and output terminals which comprises, means generating a first electrical signal having a known wave form, a first filter connected to said generating means, said first filter having a characteristic impulse response that approximates the impulse response of normal earth filtering of a seismic impulse and the impulse response of said first filter having a Laplace transform $[F(s)]$.

means connected to said first filter adjusting the amplitude of said second signal to approximate that of a normal seismic impulse, means connected to said first filter controlling the signal level thereof with time in a manner that approximates normal decay of a seismic signal with time, means connecting the output of said first filter to the input terminals of the seismograph channel to be tested, recording means connected to the output terminals of said seismograph channel adapted to record the output signal thereof, reproducing means adapted to reproduce said recorded signal, a second filter connected to the output of said reproducing means, said second filter having a characteristic impulse response whose Laplace transform is substantially the reciprocal of the Laplace transform $[1/F(s)]$ of the impulse response of said first filter, signal wave-form display means connected to the output of said second filter, and means adapted to connect said wave-form display means to said first signal generating means, whereby the wave form of the output signal of said second filter may be compared with that of said first signal.

8. The apparatus of claim 6 wherein said first filter is a band-pass filter and said second filter is a band-rejection filter.

References Cited

UNITED STATES PATENTS

| 2,618,686 | 11/1952 | De Lange | 330—2 X |
| 2,901,696 | 8/1959 | Mollfors | 324—57 |
| 2,906,947 | 9/1959 | Dischert et al. | 324—57 |
| 2,970,258 | 1/1961 | Sinclair | 324—57 |

OTHER REFERENCES

Bayley, Wireless World, "Measurement of Harmonic Harmonic Distortion," November 1961, pp. 576–581.

Louis, Radio and TV News, "Practical Techniques of Square-Wave Testing," July 1957, pp. 64–66, 133.

RUDOLPH V. ROLINEC, *Primary Examiner.*

WALTER L. CARLSON, *Examiner.*

E. E. KUBASIEWICZ, *Assistant Examiner.*